April 20, 1954     W. F. WHITCOMB, JR     2,675,620
LIQUID LEVEL INDICATOR
Filed Feb. 23, 1951
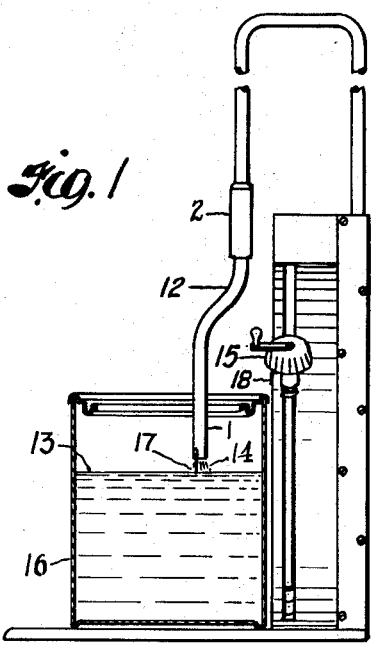
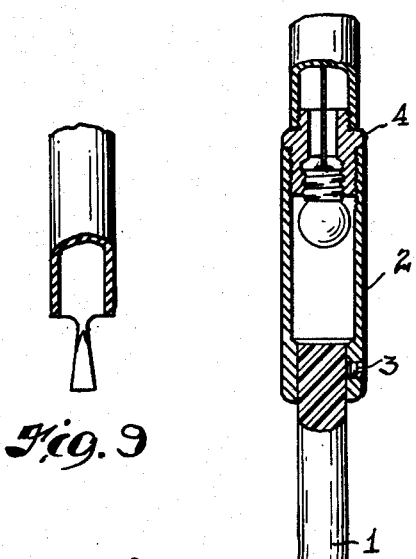
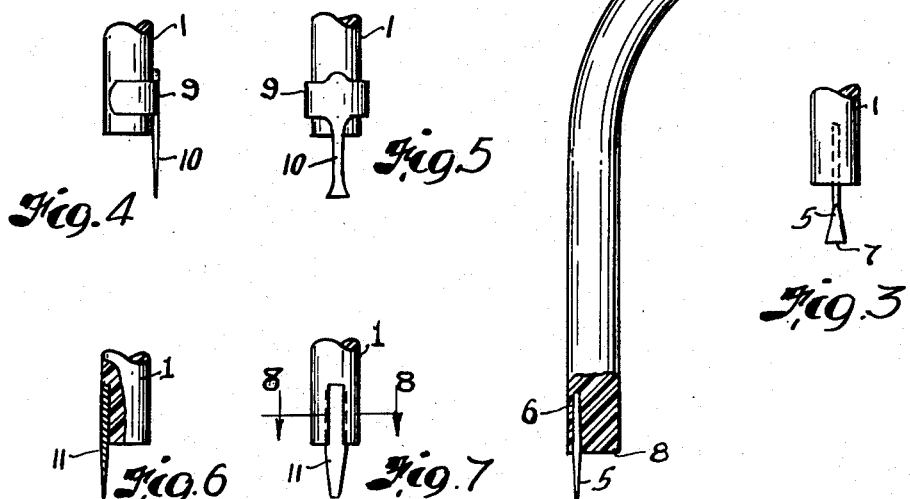
INVENTOR.
WILLIAM F. WHITCOMB JR.
BY
Robert A. Sturges
ATTORNEY Patented Apr. 20, 1954

2,675,620

UNITED STATES PATENT OFFICE 2,675,620

LIQUID LEVEL INDICATOR

William F. Whitcomb, Jr., Royal Oak, Mich., assignor, by mesne assignments, to The Sherwin-Williams Company, Cleveland, Ohio Application February 23, 1951, Serial No. 212,300

3 Claims. (Cl. 33—126)

This invention relates as indicated to a new and useful liquid level indicating device which is particularly adapted for use in connection with various proportional mixing devices and liquid level instruments.

Proportional mixing scales in which the device of this invention is particularly useful are disclosed in the patents to Marienthal 2,497,618, dated February 14, 1950, and 2,237,443, dated April 8, 1941; and the patent to Holmes, 2,169,952, dated August 15, 1939. The use of such proportional mixing scales or liquid graduating devices and some of its essential advantages to paint retail dealers are set forth in the above mentioned patents. The present invention has as its principal object the provision of a greatly improved liquid level indicating rod which renders these proportional mixing scales more accurate and much easier to operate.

It will be observed from a review of the prior patents that a preferred embodiment of the light conducting element is a "Lucite" rod. One end of the light conducting element is fitted into a collar provided with a set screw or other holding means to engage the element, and the downward end is cut at substantially right angles with the axis of the rod. In operation, the light from the source conveniently provided in the collar fitting is transmitted through the "Lucite" rod and directed against the surface of the liquid in the container as clearly shown in Pat. 2,497,618. When the liquid level reaches the lower end of the previous light conducting elements, it appears to the operator viewing the surface of the liquid from above as if the light had been extinguished, and the end point is quite definite. As an actual matter of fact, the light instead of being reflected from the surface is now discharged into the body of the liquid and there internally dispersed.

One of the principal difficulties with this type of element is that upon repeated contact with the solvents ordinarily employed in thinning lacquers and paints it becomes etched and in some cases misshapen due to the solvent effect on the plastic itself. This interferes with the accuracy of the instrument and disperses the light before reaching the surface of the liquid to a point where it becomes difficult for the operator to determine how close he is coming to the end of the light conducting element. Under such circumstances it is easy to "overpour," thereby possibly ruining a batch which is supposed to match the color of a previously prepared batch. Another difficulty with the prior art devices has been the impairment of the accuracy of the instrument because of the formation on the free end of the "Lucite" rod or the hollow metal tube of a bubble or droplet of appreciable magnitude which, as hereinafter indicated, interferes to a large extent with the accuracy of the prior devices if not carefully removed after each liquid addition.

It is another object of this invention, therefore, to provide a liquid level indicating device for use in proportional mixing scales of the type described or other such liquid level measuring machines or instruments which is free from these defects and is inherently more accurate at the end point than the devices heretofore available in the prior art.

Other objects of this invention will appear as the description proceeds.

To the accomplishment of the foregoing and related ends, said invention, then, consists of the means hereinafter fully described and particularly pointed out in the appended claims, the following description and drawings setting forth in detail certain illustrative embodiments of the invention, such disclosed means constituting, however, but a few of the various forms in which the principle of this invention may be employed.

Referring to the drawings,

Fig. 1 shows the device of the present invention in a useful embodiment.

Fig. 2 is a side elevation of the device of the present invention showing a preferred modification of the light conducting element carrying the novel "liquid level indicator."

Fig. 3 is a fragmentary front view of the device shown in Fig. 2.

Figs. 4 and 5 are fragmentary side and front elevations of a modified form of the "liquid level indicator."

Fig. 6 is a cut-away fragmentary elevation of a modified form of the "liquid level indicator."

Fig. 7 shows a front elevation of the device of Fig. 6.

Fig. 8 is a cross sectional view through the section 8—8 of Fig. 7.

Fig. 9 shows a fragmentary cut-away view of a hollow metal tube provided with the "liquid level indicator" of this invention.

As indicated above, a characteristic of the present invention constituting an improvement over prior devices is the provision of a new liquid level indicator rod in a proportional mixing scale comprising a light conducting element and a substantially axially aligned non-light conducting, preferably insoluble, projection secured to the lower end thereof, which projection is adapted to intercept the surface of a rising liquid prior to contact of said liquid with the end of the light conducting rod. More particularly, this invention comprises in a proportional mixing scale for different sizes of containers comprising a frame, a vertically movable liquid level indicator carried on said frame, means for positioning said indicator at predetermined levels and means for adjusting the scale for different sizes of containers, the improvement which comprises a liquid level indicator rod comprising a light conducting element and a substantially axially aligned non-light conducting metallic projection secured to the lower end thereof, said projection having an extension distance not more than about 3 times or less than about one-half the diameter of the light conducting element, and said projection having a cross-sectional area substantially less than the cross-sectional area of the light conducting element.

The term "substantially axially aligned" as used herein and in the appended claims should not be interpreted so narrowly as to exclude obviously equivalent devices. For example, the projection element may depend from the rear of the light conducting rod or tube and slant or curve downwardly toward the front, or the reverse. It is also obvious that a projection from the side of the rod perpendicular to the axis will not work. Essentially, the tip of the projection must intercept the liquid surface before the free end of the light conducting rod or tube, and at a point in relation to the end of said rod or tube where the surface distortion interferes with the normal reflection of the light.

In the drawings Fig. 1, as indicated above, shows the device of this invention in a useful embodiment in a proportional mixing device. The liquid level indicating device of this invention is carried at the lower end of the rod 1, the latter being attached to a vertically movable carrier rod through the collar 2 carried in a frame such as illustrated, but not otherwise identified. The lower end of the rod 1 is movable through mechanical means associated with the knob 15 carrying a scale indicating device 18 which travels along an arcuate path, subdivided into convenient units, said arcuate scale not shown. Suitable means are provided within the frame for translating the arcuate motion of the arm carrying the knob 15 into vertical motion. It will be seen, therefore, that predetermined proportions along the arcuate scale may be selected and the device locked into position by means of the knob 15, and this operation repeated until the formulation is complete.

Figs. 2 and 3 show a preferred embodiment of the present invention including a rod 1, of any light conducting material such as quartz, "Lucite," "Plexiglas" or the like. The latter type of material is preferred since it is by far the easiest to work into shapes such as has been found most satisfactory for use in connection with proportional mixing devices. The peculiar property of "Lucite" for practically total internal reflection of light makes possible its adaptation for these purposes. This property is contemplated in the phrase "light conducting" as used herein and in the appended claims. This term also contemplates the use of a hollow metal tube having smooth internal walls which will provide substantially the same effect, particularly if said walls are polished or mirror finished. An internally silvered glass tube may also be employed.

The upper end of the light conducting rod 1 may be fitted with a suitable collar 2, as also shown in Pat. 2,497,618, and which is adapted to hold the light conducting rod 1 by a set screw 3 or other such frictional or mechanical means. The collar 2 is conveniently threaded at the remote end to engage a socket 4 for a light source. The lower end of the light conducting rod is fitted with a suitable projection 5 constructed of a non-light conducting material. As shown in Fig. 2, this member 5 is an iron wire having a diameter substantially less than that of the light conducting rod and embedded in a recess 6 in the light conducting element 1. In the preferred embodiment, the member 5 may be cemented in the recess 6 by applying a small amount of solvent sufficient to soften the plastic thereby securing the member 5. Of course, the member 5 may be so constructed as to be frictionally retained within the recess 6 in the rod 1. Also in the preferred embodiment, the member 5 is provided with a widened tip 7 at its free end, which tip is desirably sharpened to an edge which is substantially perpendicular to the axis of the rod 1. Also as shown in Fig. 2, the retaining recess 6 is preferably displaced from the centerline of the rod 1 so that as little interference with the projection of light from the free end 8 of the rod 1 as possible is sustained. The recess 6 may be either forward or to the rear of the centerline or still less desirably to either side of the centerline of the rod 1. The projecting member 5 is conveniently constructed of iron or other such metal, wood, glass, opaque or coated plastic, or any other such non-light conducting material. It has been found convenient to construct the projecting member 5 from an ordinary nail by slightly crimping one end to aid frictional retention in the recess 6 and flattening and sharpening the downward end to provide a knife edge 7 as shown in Fig. 2.

Figs. 4, 5, 6, 7 and 8 show modifications of the projection member 5, Figs. 4 and 5 showing the use of an ordinary pencil clip 9 adapted to engage the circumference of the rod 1 with the lower end of the downwardly depending arm 10 extending below the lower end 8 of the rod 1.

Figs. 6, 7 and 8 show a projection member 11 inserted, as by a dovetail locking means, in the lower end of the rod 1. The shank of each of the projection members illustrated is desirably of such width that the reflection of the projected light from the surface of the rising liquid is not substantially obscured to the operator looking down into the container from above and to the front.

Fig. 9 is an example of a hollow tube fitted with a projecting element.

With respect to preferred dimensions of projecting members 5, 10 and 11, it is clear that the principal consideration is to avoid obstructing the passage of light from the lower end of the rod 1 to the surface of the rising liquid insofar as is possible. Accordingly, the cross-sectional area of the projection member should be substantially less than the diameter of the light conducting rod, particularly where the projecting element is retained in a recess at the lower end of the rod 1. In the preferred embodiment shown in Fig. 2 hereof, the light conducting rod is approximately 3/8 of an inch in diameter and the diameter of the projecting member 5 is approximately 3/32 of an inch. Of course, these devices will operate where as little as 1/4 or even less of the light conducted by the rod 1 is projected to the surface of the liquid because of the obstruction of ¾ or slightly more of the lower end of the rod by the projecting member. However, although the end point is just as sharp in such a case, the visibility to the operator is unduly impaired. Of course structural durability, i. e., rigidity, is desirable to make the instrument as resistant to rough handling as possible. A suitable cross-sectional area of the projecting member, therefore, ranges from about 1/500 of the area of the light conducting rod up to as much as ½ of the cross-sectional area of the light conducting rod. It makes no difference whether the projecting element is rectangular or circular in cross-section, and likewise it makes no difference whether the cross-sectional appearance of the light conducting rod is rectangular or circular.

The extension distance occasioned by the implacement of the projecting elements 5, 10 and 11 or other equivalent members is again determined more or less by a matter of convenience, close tolerances being unnecessary. However, it is obvious that an extension of several inches will defeat the purpose of the device since at that distance the light is so widely scattered as it emerges from the end of the rod that a bright circle or area of light does not appear and very little difference will be noted in the reflected light from the surface of the liquid at the time contact of the projecting element is made. On the other hand, if the extension distance is too short, visibility of the reflected light area will be impaired just prior to contact when visibility is most important. Accordingly, the projection extension distance is desirably less than 3 times the diameter of the rod and more than ½ the diameter of the rod. These limits merely serve to indicate the approximate size of the projecting element, it being understood that shorter or even longer projection extension distances may be employed depending upon the placement of the element in relation to the light conducting rod.

With respect to placement of the element, it has been found most satisfactory to place the element forward of the axis of the rod, thereby allowing greater visibility to the operator as the rising liquid surface approaches the end of the projection. Although the projecting element may depend from the backward part of the light conducting rod, in such case it will generally have to be somewhat longer in order that its lower end be visible to an operator standing in front of the device.

The principle upon which the device of the present invention operates is entirely different from the principle of operation of the prior art devices both in result and in means of obtaining said result. As has been pointed out above in connection with the prior art light conducting elements, the surface of the rising liquid comes in actual contact with the lower end of the rod 1 causing an apparent extinguishment of the light since the light instead of being reflected from the surface of the liquid is now transmitted into and dispersed in the liquid. When the mixing device is readjusted to the next proportional amount of liquid to be added, a drop of liquid remains on the lower end of the light conducting element. This must be removed before another measurement is made or there will be an error in the amount of liquid added before the instrument indicates the end point which error is substantially proportional to the diameter of the container and the depth of the retained drop on the end of the light conducting element. In the blending of coating compositions and lubricating oil compositions, for example, errors of this magnitude cannot be tolerated readily.

The improved devices of the present invention operate on an entirely different principle. When the surface of the rising liquid comes in contact with the projecting member 5, the liquid, because of capillary attraction, rises slightly at the point of contact so distorting the surface of the liquid that the light is no longer reflected back to the eyes of the operator, but is now reflected at a wide variety of different angles toward the sides of the container. Again, it appears as though the light had been extinguished very suddenly. The use of a knife edge on the projecting member 5 makes possible an extremely close approach to the surface of the liquid before contact is made. This has been actually measured to be on the order of .002 to .003 inch. Moreover, when the tip is withdrawn from the liquid, the amount retained on the very small surface is of such magnitude that the accuracy of the device is not materially altered particularly when a very thin solvent, such as a lacquer solvent, is floated on top of the contents of the container. Although a knife edge has been shown in the preferred embodiment, it is clear that a sharp point or "ball point" may be employed in lieu of the knife edge. Another adaptation of the principle of this invention is achieved by axially slotting the lower end of the light transmitting rod to provide a frictional retaining means for a rectangular piece of metal which projects below the end of the light transmitting rod. This form of the device operates just as well, but is a little more cumbersome to use. It will be observed that instead of frictionally retaining the projecting member either internally or externally of the light conducting rod, threaded means for internally retaining the projection may also be employed. Other such securing means will be readily apparent to those skilled in the art.

The light conducting rod may be constructed of any suitable light conducting medium such as a synthetic resin, for example, the well known synthetic substance called "Lucite" which is a polymethyl methacrylate resin. "Plexiglas" is another synthetic resin of the same type. A hollow metal tube, preferably straight, desirably having polished internal walls may be used in lieu of a solid light conducting medium, the lower end being fitted with a suitable projecting member in the manner aforesaid.

As indicated above, Fig. 1 shows an embodiment of the present invention in a useful device. In Fig. 1, the surface of the liquid indicated at 13 is rising to a level close to the lower end of the light transmitting rod 1 where light rays indicated by the broken lines 14 form an illuminated spot on the surface of the liquid.

The tip of the "liquid level indicator" is, as indicated above, adjustable to various positions in a vertical direction, which positions represent a proportional amount of the entire volume of liquid to be mixed in the container 16. Assuming, therefore, that it is desired to blend 20 parts of liquid A, 30 parts of liquid B and 50 parts of liquid C by volume, the tip 17 is positioned by suitable means at a point above the bottom of the container, equivalent to 20% of the total volume of blend to be produced. The first liquid A, is introduced into the container, and as the level rises, its approach to the lower end of the rod 1 is clearly discernible and the bright circle of light reduces in size and increases in brilliance warning that the surface is nearing the lower end of the liquid level indicator at which point the circle of light is approximately the smallest and nearly its brightest. Pouring is correspondingly slowed as the liquid approaches the lower end 17 of the projecting element 5. Liquid A is then dropped in slowly until the level rises to just contact the point 17. At this point, the light appears to have been extinguished because of the deformation of the surface of the liquid due to the capillary forces of the liquid, forming a peak in said surface. This peak has a downwardly curving surface surrounding the projecting element 5, which curved surface serves to reflect the light at an infinite variety of angles thereby causing the apparent extinguishment of the light.

The rod 1 is then raised to provide for the addition of 30 parts more of liquid B, that is, the instrument would be set at a point equivalent to 50% of the total volume being measured. The same sequence of operations is then repeated in the manner indicated above.

Finally the tip of the projecting element 5 is positioned at a point equivalent to 100% of the volume being measured to allow for the introduction of 50 parts of liquid C and the operational steps again repeated.

In the use of the transparent light conducting medium such as has been described, some of the light, of course, escapes along the surface, but the major portion is directed in a beam from the lower end.

It is to be understood that devices embodying the article of this invention may be used for the blending of various liquid mixtures, such as, for example, blending of lubricating oil compositions.

From the foregoing description of the invention, it will be seen that there has been provided an improved liquid level indicating device comprising a light conducting rod having the lower end thereof fitted with a non-light conducting projection member extending downwardly and in substantial axial alignment with said rod and being of a size substantially less in cross-sectional area of the light transmitting rod. This device is useful in liquid level measuring or recording devices adapted to permit proportional mixing of a plurality of liquids, examples of which devices are clearly described in the patents to Marienthal 2,497,618 and 2,237,443 and the patent to Holmes 2,169,952. In the following claims where reference is had to a proportional mixing device, it is intended that machines of the type or operating on the principle described in the foregoing patents are contemplated.

Other modes of applying the principle of this invention may be employed instead of those specifically set forth above, changes being made as regards the details herein disclosed provided the elements set forth in any of the following claims, or the equivalent of such be employed.

I, therefore, particularly point out and distinctly claim as my invention:

1. In a proportional mixing scale for different sizes of containers, the improvement which comprises a vertically extending liquid level indicator rod comprising a light conducting rod supported at its upper end and a non-light conducting projection secured to the lower end thereof and extending downwardly to a position below the end of said rod.

2. In a proportional mixing scale for different sizes of containers, the improvement which comprises a vertically extending liquid level indicator rod comprising a light conducting rod supported at its upper end and a non-light conducting metallic projection secured to the lower end thereof and extending downwardly to a position below the end of said rod, said projection having an extension distance not more than about 3 times or less than about one-half the diameter of the light conducting rod, and said projection having a cross-sectional area substantially less than the cross-sectional area of the light conducting rod.

3. In a proportional mixing scale for different sizes of containers, the improvement which comprises a vertically extending liquid level indicator rod comprising a light conducting rod supported at its upper end and a non-light conducting metallic projection secured to the lower end thereof and adapted to intercept the surface of a rising liquid to produce a deformation in the surface thereof whereby the light impinging on the surface of said rising liquid is scattered so as to become substantially invisible.

References Cited in the file of this patent

UNITED STATES PATENTS

| Number | Name | Date |
|---|---|---|
| 1,526,659 | Bogart | Feb. 17, 1925 |
| 2,098,963 | Hexter | Nov. 16, 1937 |
| 2,127,042 | Morrell | Aug. 16, 1938 |
| 2,169,952 | Holmes | Aug. 15, 1939 |
| 2,237,443 | Marienthal | Apr. 8, 1941 |
| 2,269,737 | Rogers | Jan. 13, 1942 |
| 2,288,093 | Kaffenberger et al. | June 30, 1942 |
| 2,311,439 | Iwanowicz | Feb. 16, 1943 |
| 2,326,111 | Zachos | Aug. 10, 1943 |
| 2,497,618 | Marienthal | Feb. 14, 1950 |
| 2,561,525 | McCauley | July 24, 1951 |